United States Patent
Seo et al.

(10) Patent No.: US 9,451,100 B2
(45) Date of Patent: Sep. 20, 2016

(54) METHOD FOR TRANSMITTING NOTIFICATION INFORMATION AND ELECTRONIC DEVICE THEREOF

(71) Applicant: Samsung Electronics Co., Ltd., Suwon-si, Gyeonggi-do (KR)

(72) Inventors: Suck-Ho Seo, Suwon-si (KR); Hyeong-Geun Kim, Suwon-si (KR); Sung-Ho Park, Gwangju (KR); Dong-Hyoun Son, Suwon-si (KR); Ji-Ryang Chung, Suwon-si (KR); Sang-Hyun Han, Suwon-si (KR); Il-Sung Hong, Seoul (KR); Ji-Young Hwang, Seoul (KR); Ji-Hyun Park, Seongnam-si (KR); Jin-Hyuk Lee, Suwon-si (KR); Na-Rae Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/463,245

(22) Filed: Aug. 19, 2014

(65) Prior Publication Data
US 2015/0065095 A1    Mar. 5, 2015

(30) Foreign Application Priority Data

Aug. 28, 2013 (KR) .......................... 10-2013-0102720
Sep. 3, 2013 (KR) .......................... 10-2013-0105729

(51) Int. Cl.

| | |
|---|---|
| *H04M 1/725* | (2006.01) |
| *H04M 19/04* | (2006.01) |
| *H04L 29/08* | (2006.01) |
| *H04L 12/58* | (2006.01) |
| *H04L 12/18* | (2006.01) |
| *H04N 21/41* | (2011.01) |
| *H04N 21/414* | (2011.01) |
| *H04N 21/436* | (2011.01) |
| *H04L 12/28* | (2006.01) |
| *H04W 4/18* | (2009.01) |
| *H04W 4/16* | (2009.01) |

(52) U.S. Cl.
CPC .......... *H04M 19/04* (2013.01); *H04L 12/1895* (2013.01); *H04L 12/2816* (2013.01); *H04L 12/2836* (2013.01); *H04L 51/24* (2013.01); *H04L 67/26* (2013.01); *H04L 67/2823* (2013.01); *H04M 1/7253* (2013.01); *H04N 21/4117* (2013.01); *H04N 21/4126* (2013.01); *H04N 21/4131* (2013.01); *H04N 21/41407* (2013.01); *H04N 21/436* (2013.01); *H04W 4/18* (2013.01); *H04L 2012/2841* (2013.01); *H04W 4/16* (2013.01)

(58) Field of Classification Search
CPC ... H04L 67/42; H04L 67/2823; H04L 69/08; G06F 3/1247; G06F 3/1254
USPC ....................................... 455/412.2
See application file for complete search history.

(56) References Cited

U.S. PATENT DOCUMENTS 5,657,446 A * 8/1997 Pinard et al. ............... 379/90.01
RE37,258 E * 7/2001 Patel et al. ................. 358/1.15

(Continued)

*Primary Examiner* — Don N Vo
(74) *Attorney, Agent, or Firm* — Jefferson IP Law, LLP

(57) ABSTRACT

A method in an electronic device is provided. The method includes identifying an output characteristic of at least one peripheral device, converting or reconfiguring output information of an event generated by at least one application program based on the identified output characteristic, and transmitting the converted or reconfigured output information of the event to the at least one peripheral device.

22 Claims, 17 Drawing Sheets

(56) References Cited

U.S. PATENT DOCUMENTS

| | | | |
|---|---|---|---|
| 7,272,836 B1 * | 9/2007 | Taylor | 719/328 |
| 2001/0014237 A1 * | 8/2001 | Shima | 400/61 |
| 2011/0013223 A1 * | 1/2011 | Nishimura et al. | 358/1.15 |
| 2013/0080541 A1 | 3/2013 | Herbert | |
| 2014/0325100 A1 * | 10/2014 | Jung | G06F 13/10 710/72 |

* cited by examiner

METHOD FOR TRANSMITTING NOTIFICATION INFORMATION AND ELECTRONIC DEVICE THEREOF

CROSS-REFERENCE TO RELATED APPLICATION(S)

This application claims the benefit under 35 U.S.C. §119(a) of a Korean patent application filed on Aug. 28, 2013 in the Korean Intellectual Property Office and assigned Serial number 10-2013-0102720 and a Korean patent application filed on Sep. 3, 2013 in the Korean Intellectual Property Office and assigned Serial number 10-2013-0105729, the entire disclosures of which are hereby incorporated by reference.

TECHNICAL FIELD

The present disclosure relates to a method for transmitting notification information and an electronic device thereof.

BACKGROUND

Due to the development of information communication technology and semiconductor technology, various electronic devices are developing into multimedia devices providing various multimedia services. For example, the electronic devices provide various multimedia services such as messenger services, broadcasting services, wireless internet services, camera services, and music playback services.

The above information is presented as background information only to assist with an understanding of the present disclosure. No determination has been made, and no assertion is made, as to whether any of the above might be applicable as prior art with regard to the present disclosure.

SUMMARY

A user of an electronic device requires more various services. Accordingly, the electronic device requires services for satisfying user's various demands.

Aspects of the present disclosure are to address at least the above-mentioned problems and/or disadvantages and to provide at least the advantages described below. Accordingly, an aspect of the present disclosure is to provide a device and method for transmitting notification information to a peripheral device from an electronic device.

Another aspect of the present disclosure is to provide a device and method for converting or reconfiguring notification information based on the output characteristic of a peripheral device and transmitting the notification information to a corresponding peripheral device in an electronic device.

Another aspect of the present disclosure is to provide a device and method for recognizing an application program including a notification event characteristic as a virtual device in an electronic device.

Another aspect of the present disclosure is to provide a device and method for recognizing an application program generating a notification event as a virtual device in an electronic device.

Another aspect of the present disclosure is to a device and method for determining which peripheral device notification information is to be transmitted based on connection information with a peripheral device in an electronic device.

In accordance with an aspect of the present disclosure, an operating method of an electronic device is provided. The operating method includes identifying an output characteristic of at least one peripheral device, converting or reconfiguring output information of an event generated by at least one application program based on the identified output characteristic of the at least one peripheral device, and transmitting the converted or reconfigured output information of the event to the at least one peripheral device.

In accordance with another aspect of the present disclosure, an electronic device is included. The electronic device includes a memory configured to store at least one application program, and a notification providing module configured to identify an output characteristic of at least one peripheral device, to convert or reconfigure output information of an event generated by at least one application program among application programs stored in the memory based on the identified output characteristic of the at least one peripheral device, and to transmit the converted or reconfigured output information of the event to the at least one peripheral device.

In accordance with another aspect of the present disclosure, an electronic device is included. The electronic device includes a memory configured to store at least one application program, and a processor, wherein the processor is configured to identity an output characteristic of at least one peripheral device, to convert or reconfigure output information of an event generated by at least one application program among application programs stored in the memory based on the identified output characteristic of the at least one peripheral device, and to transmit the converted or reconfigured output information of the event to the at least one peripheral device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
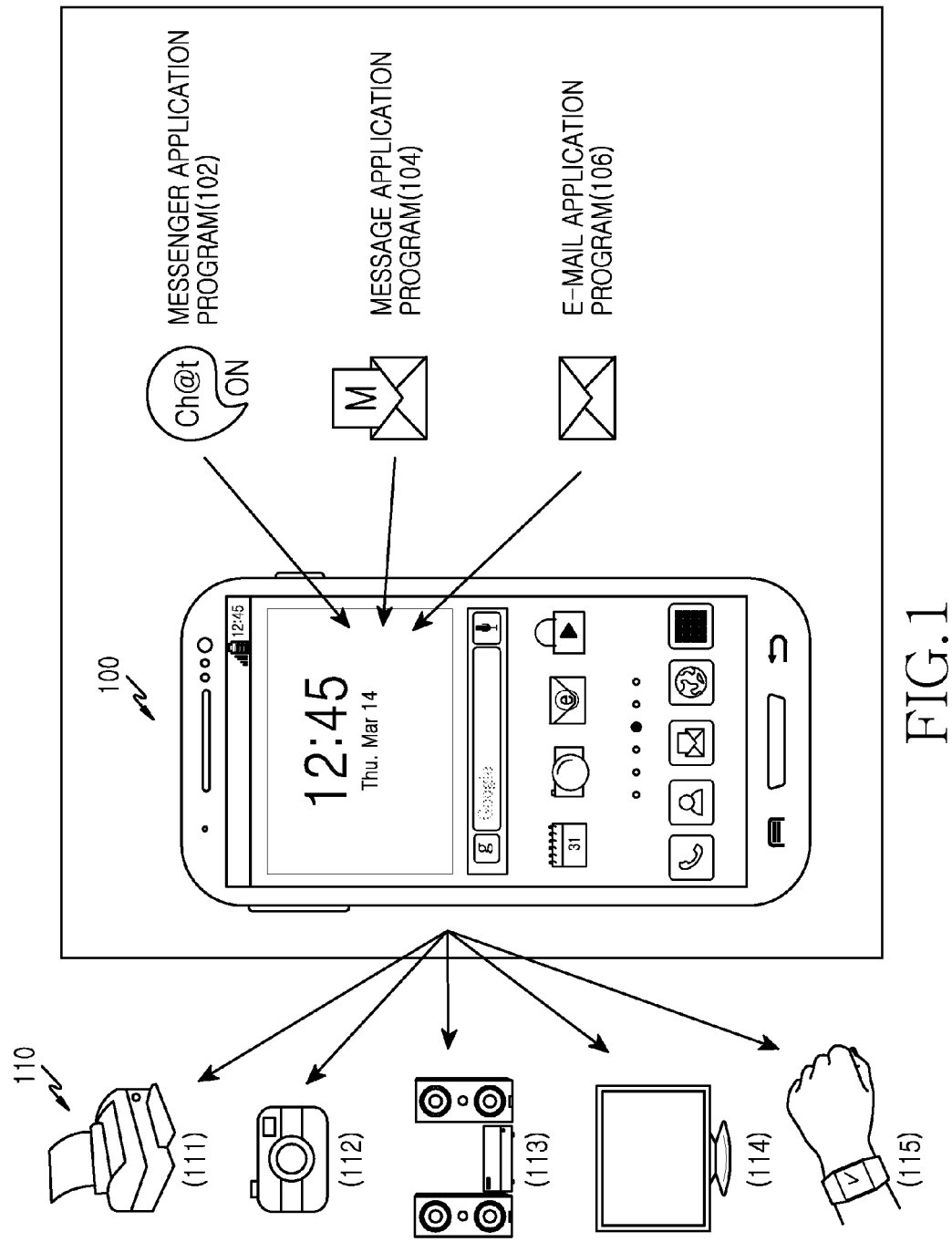
FIG. 1 is a view illustrating a structure for transmitting notification information in an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure relate generally to a method for transmitting notification information from an electronic device. Hereinafter, an electronic device according to an embodiment of the present disclosure may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical equipment, cameras, wearable devices, electronic watches, wrist watches, refrigerators, air conditioners, vacuum cleaners, artificial intelligence robots, televisions (TVs), digital versatile disc (DVD) players, audios, ovens, microwaves, washing machines, air purifiers, medical devices (e.g., magnetic resonance angiography (MRA), magnetic resonance imaging (MRI), computed tomography (CT), camcorders, and ultrasonic devices), navigation devices, global positioning system (GPS) receivers, event data recorders (EDRs), flight data recorders (FDRs), set-top boxes, TV boxes (e.g., Samsung HomeSync™, Apple TV™, or Google TV™), electronic dictionaries, automotive infotainment devices, marine electronic equipment (e.g., marine navigation systems and gyro compasses), avionics equipment, security equipment, camcorders, game consoles, furniture/part of a building/structure including an electronic device, electronic boards, electronic signature input devices, projectors, and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Hereinafter, a peripheral device according to an embodiment of the present disclosure may include at least one other electronic device connectible to an electronic device. For example, the peripheral device may include external electronic device such as electronic watches, electronic glasses.

FIG. 1 is a view illustrating a structure for transmitting notification information in an electronic device according to an embodiment of the present disclosure.

Referring to FIG. 1, the electronic device 100 may be connected to at least one peripheral device 110 through wire link or wireless link. For example, the electronic device 100 may be connected to the peripheral device 110 such as a printer 111, a camera 112, an audio player 113 (e.g., a stereo system), a TV 114, an electronic watch 115, and/or the like through a short-range communication network and/or a short-range communication connection.

When a notification event occurs by at least one application program 102, 104, or 106 installed in the electronic device 100, the electronic device 100 may transmit notification event information generated by the application program 102, 104, or 106 to at least one peripheral device 110. At this point, the electronic device 100 may convert or reconfigure the notification event information based on the output characteristic of the peripheral device 110 and then may transmit the notification event information to the corresponding peripheral device 110. The output characteristic of the peripheral device 110 may include an output method for delivering information (e.g., auditory information using a speaker, visual information using a display unit and a luminous body, and tactile information by vibration) to a user from the peripheral device 110.

Figure 2:
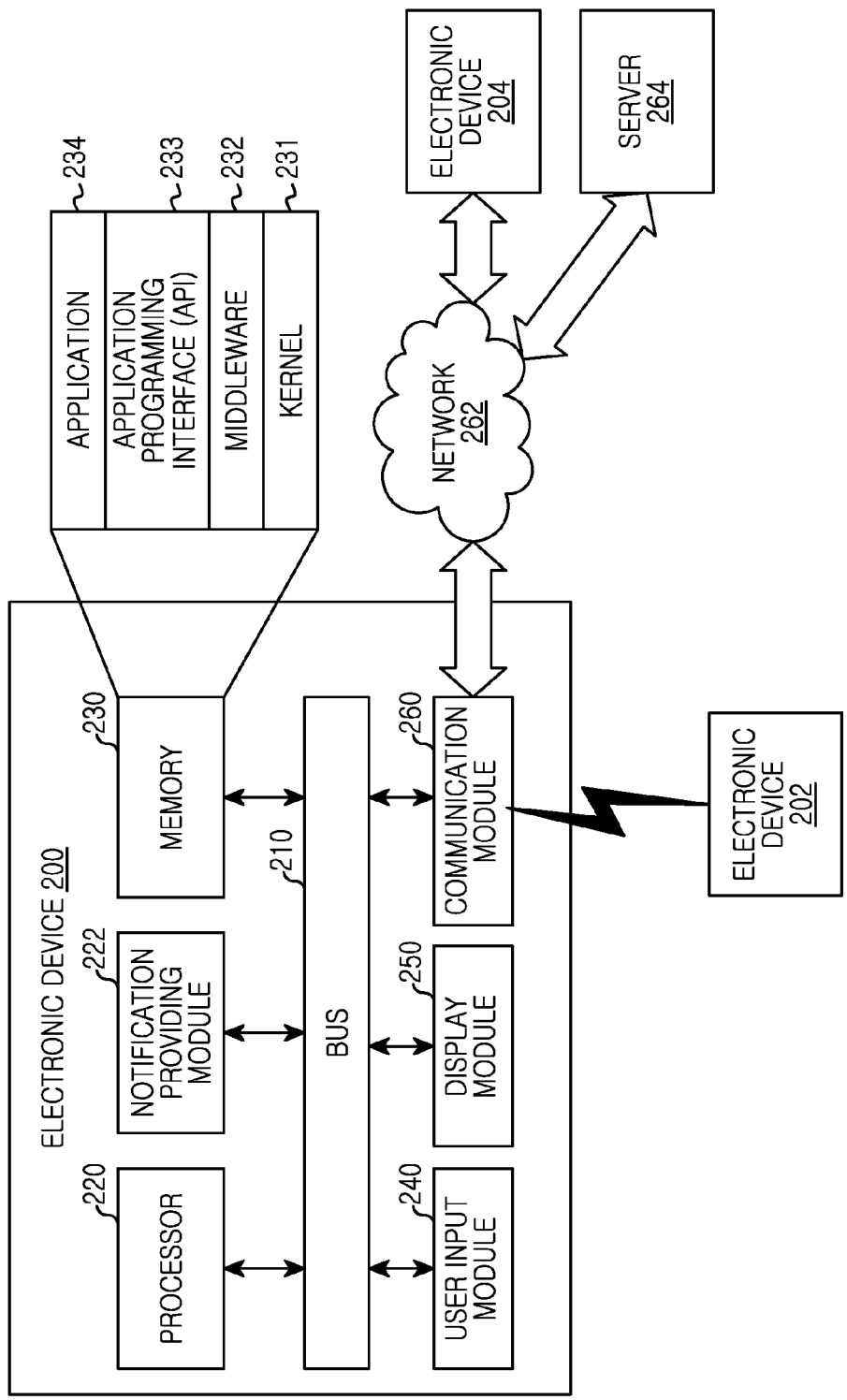
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device 200 may include a bus 210, a processor 220, a notification providing module 222, a memory 230, an input module 240, a display module 250, a communication module 260, and/or the like.

The bus 210 may connect components included in the electronic device 200 each other and may control communication between components included in the electronic device 200.

The processor 220 may control the electronic device 200 to provide various services. For example, the processor 220 may interpret a command received from the above other components included in the electronic device 200 (e.g., the memory 230, the input module 240, the display module 250, the communication module 260, and/or the like) through the bus 210 and may perform operations and data processing in response to the interpreted command.

The processor 220 may perform a control to provide various multimedia services by executing at least one program stored in the memory 230. For example, the processor 220 may set an application program including a notification event characteristic as a virtual device by executing a device management application 478 included in the application 234 of the memory 230. At this point, the processor 220 may execute the device management application 478 included in the application 234 through the device management manager 454 of the middleware 232 and may then set it as a virtual device.

A notification providing module 222 may control notification event information of the virtual device to be transmitted to at least one peripheral device. For example, the notification providing module 220 may execute a notification providing application 477 included in the application 234 of the memory 230 and may convert notification event information provided from a virtual device according to the output characteristic of a peripheral device and may perform a control to transmit the notification event information (e.g., the converted notification event information) to a corresponding peripheral device. At this point, the processor 220 may execute the notification providing application 477 included in the application 234 through the system providing manager 453 of the middleware 232 and may then control notification event information of a virtual device to be transmitted to at least one peripheral device.

The memory 230 may store commands or data received from or generated by at least one component (e.g., the processor 220, the input module 240, the display module 250, or the communication module 260) included in the electronic device 200. For example, the memory 230 may store the output characteristic of a peripheral device connectable to the electronic device 200 and application program information recognized as a virtual device.

The memory 230 may include programming modules such as a kernel 231, a middleware 232, an application programming interface (API) 233, an application 234, and/or the like. At this point, each programming module may include at least one of software, firmware, and hardware.

The kernel 231 may control or manage at least one system resource used for executing an operation or a function implemented by another programming module (e.g., the middleware 232, the API 233, the application 234, and/or the like). Additionally, the kernel 231 may provide an interface for accessing an individual component of the electronic device 200 among the middleware 232, the API 233, the application 234, and/or the like to control or manage the individual component. The system resource may include at least one of the bus 210, the processor 220, the memory 230, and/or the like.

The middleware 232 may serve as an intermediary role for exchanging data between the API 233 or the application 234 and the kernel 231 through communication. The middleware 232 may perform load balancing for work requests received from at least one application 234.

The middleware 232 may provide functions through the API 233 to efficiently use a limited system resource in the electronic device 200. Additionally, the middleware 232 may include a plurality of pre-implemented modules for providing functions that the application 234 commonly requires.

The API 233 may include an interface for allowing the application 234 to control functions provided from the kernel 231 or the middleware 232. For example, the API 233 may include at least one interface of function for file control, window control, image processing, text control, and/or the like.

The application 234 may include at least one application executed through the middleware 232 or the API 233.

The input module 240 may transmit instructions or data generated by a user selection to the processor 220 or the memory 230 through the bus 210.

The display module 250 may display an image, a video, data, and/or the like to a user.

The communication unit 260 may connect a communication between at least one other electronic device (e.g., electronic device 202, electronic device 204, server 264, and/or the like) or at least one peripheral device and the electronic device 200. For example, the communication unit 260 may support a short range communication protocol (e.g., wireless fidelity (Wi-Fi), bluetooth (BT), near field communication (NFC), WiFi Direct, infrared data association (IrDA) communication, and/or the like), or a network communication 262 (e.g., internet, local area network (LAN), wide area network (WAN), telecommunication network, cellular network, satellite network, plain old telephone service (POTS), and/or the like). At this point, a communication protocol (for example, a short-range communication protocol, a network communication protocol, and a wired communication protocol) may be supported by the middleware 232 or the API 233 of the memory 230. The other electronic device 202 and/or electronic device 204, as a peripheral device of the electronic device 200, may include a device having the same type as the electronic device 200 or a different type than the electronic device 200. The electronic device 200 may be connected to another electronic device (e.g., electronic device 202, electronic device 204, server 264, and/or the like) through the network 262 and/or through a direct connection.

Figure 3:
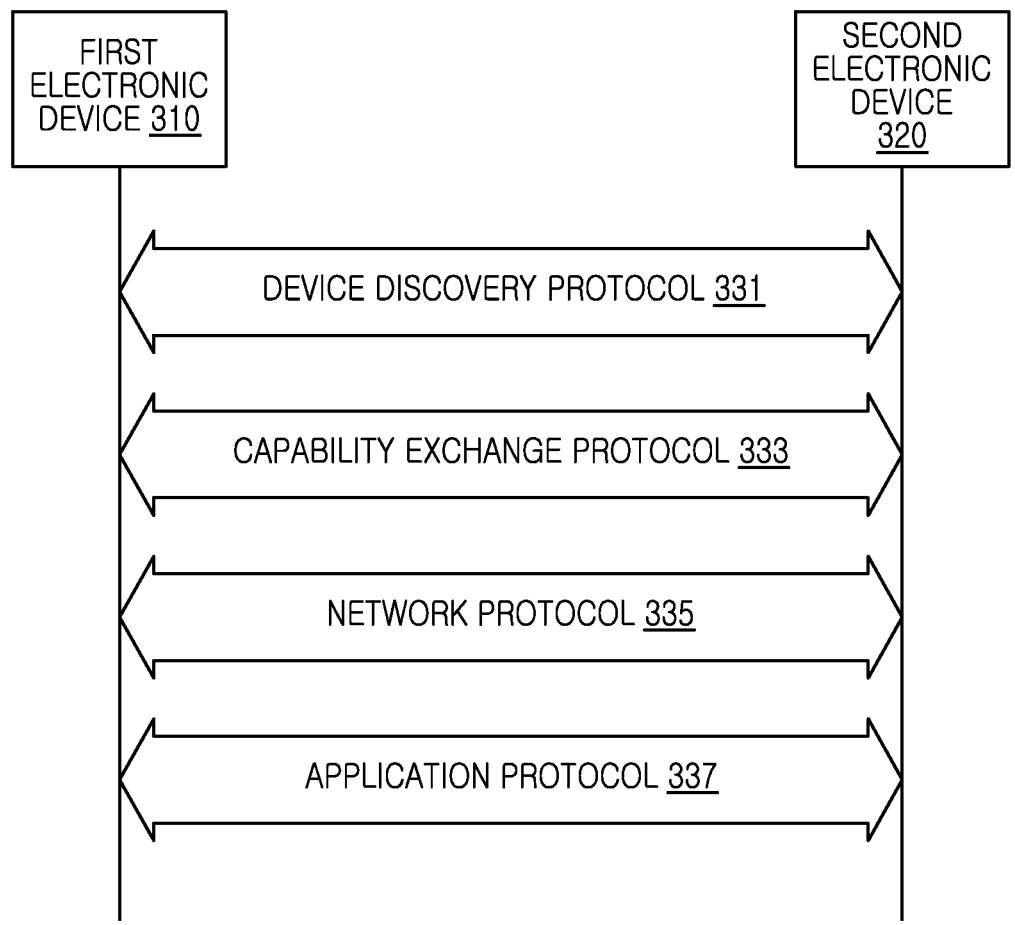
FIG. 3 is view illustrating a communication protocol of electronic devices according to an embodiment of the present disclosure.

FIG. 3 is a view illustrating a communication protocol of electronic devices according to an embodiment of the present disclosure. Here, the communication protocol 300 may include a standard communication protocol or a communication protocol designated by an individual or an organization.

Referring to FIG. 3, the communication protocol 300 may include a device discovery protocol 331, a capability exchange protocol 333, a network protocol 335, and an application protocol 337.

The device discovery protocol 331 may include a protocol for detecting or connect to one or more external electronic device that may be communicated with the electronic device 200. For example, a first electronic device 310 (e.g., electronic device 200) may detect at least one second electronic device 320 as an electronic device that may be communicated with first electronic device 310. The detection may be performed using device discovery protocol 331 via one or more communication methods (e.g., Wi-Fi, Bluetooth or USB) available the first electronic device 310. At this point, the first electronic device 310 may identify at least one second electronic device 320 by using the device discovery protocol 331 and may store identification information on at least one second electronic device 320 in the memory 230. Additionally, the first electronic device 310 may connect a communication with at least one second electronic device 320 by using the device discovery protocol 331.

The device discovery protocol 331 may include a protocol for mutual authentication between a plurality of electronic devices. For example, the first electronic device 310 may perform authentication with at least one second electronic device 320 by using the device discovery protocol 331.

The capability exchange protocol 333 may include a protocol for exchanging information associated with functionalities of services that may be supported by at least one of electronic device 310 or electronic device 320. For example, first electronic device 310 and second electronic device 320 may exchange information associated functionalities of services that may be supported by the respective devices. The information that may be exchanged may include, for example, identification information that identifies a specific service that is supported by either first electronic device 310 or second electronic device 320, or both. When first electronic device 310 receives the identification information that identifies the specific service, first electronic device 310 may, based on the received identification information, determine whether it may support the specific service identified by the identification information.

The network protocol 335 may include a protocol for controlling data flow transmitted and/or received between electronic devices that are connected to each other (e.g., electronic device 310 and electronic device 320). The data transmitted and/or received may be data associated with services that are being provided by the electronic devices. For example, at least one of first electronic device 310 or second electronic device 320 may use network protocol 335 to perform, for example, at least one of error control or data quality control. Additionally or alternatively, network protocol 335 may determine a transmission format for data transmitted and received between first electronic device 310 and second electronic device 320. Also, at least one of first electronic device 310 or second electronic device 320 may perform session management (e.g., establish a session or terminate a session) associated with exchanging data between each other, using network protocol 335.

The application protocol 337 may include a protocol for providing process or information to exchange data associated with one or more services provided to an external electronic device. For example, first electronic device 310 (e.g., electronic device 200) may provide one or more services to electronic device 320 using application protocol 337.

Figure 4:
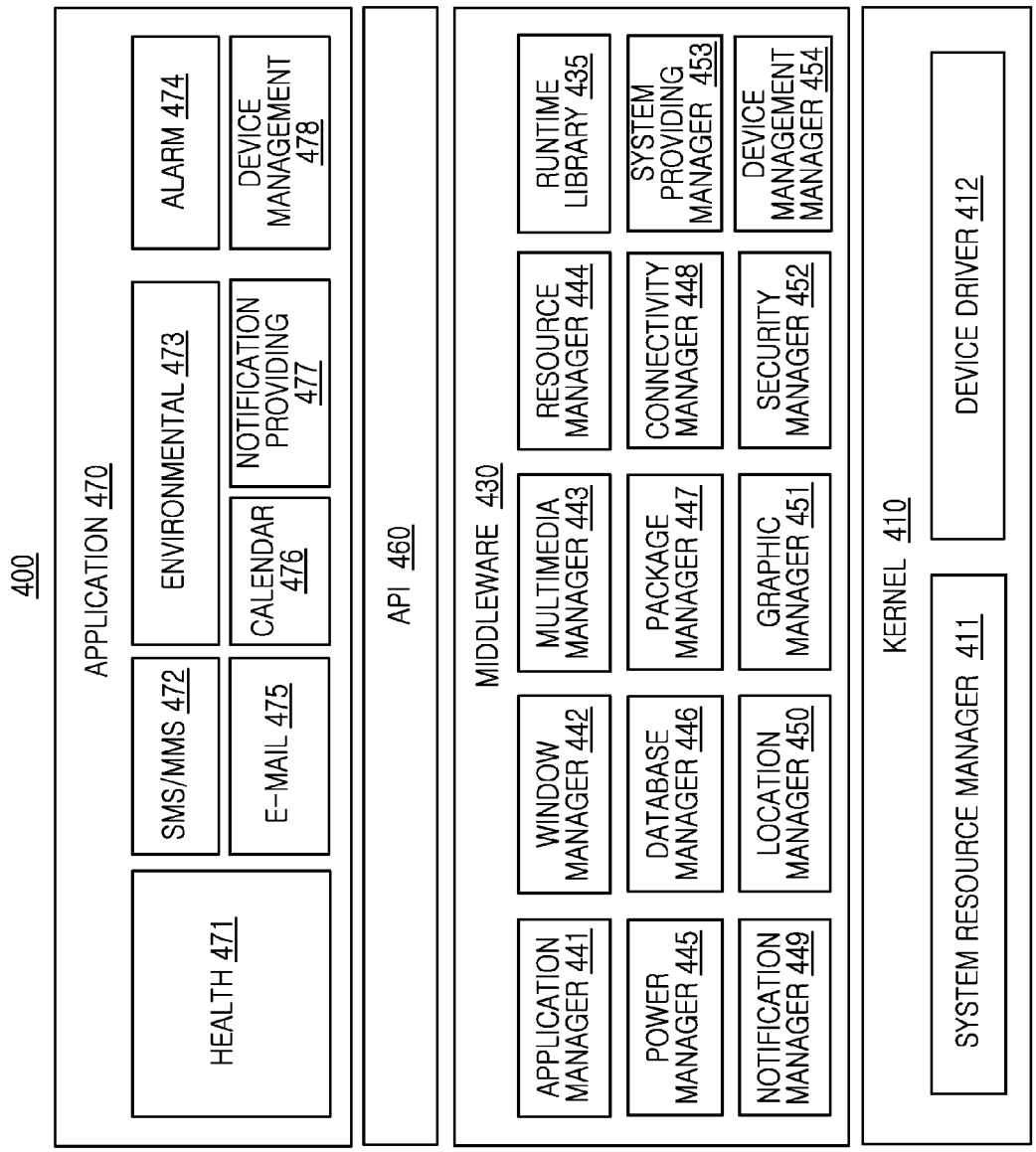
FIG. 4 is a block diagram illustrating a configuration of a programming module according to an embodiment of the present disclosure.

FIG. 4 is a block diagram illustrating a configuration of a programming module according to an embodiment of the present disclosure.

Referring to FIG. 4, the programming module 300 includes a kernel 410, a middleware 430, an API 460, an application 470, and/or the like. The programming unit 400 may be stored in the memory 230 of the electronic device 200 shown in FIG. 2.

The programming module 400 may include an operating system (OS) controlling a resource relating to the electronic device 100 or various applications running on the OS. For example, the OS may include at least one of Android, iOS, Windows, Symbian, Tizen, Bada, and/or the like.

The kernel 410 may include at least one of a system resource manager 411 and a device driver 412.

The system resource manager 411 may perform the control, allocation, and/or retrieval of a system resource. For example, the system resource manager 411 may include at least one of a processor management unit, a memory management unit, and a file system management unit.

The device driver 412 may perform an operation implemented by another component (e.g., the middleware 430, the API 460, or the application 470) of the programming module 400 or an operation for controlling a system resource used for executing a function. For example, the device driver 412 may include at least one of a display driver, a camera, a Bluetooth driver, a sharing memory driver, a USB driver, a keypad drive, a wireless LAN driver, an audio driver, an Inter-Process Communication (IPC) driver, and/or the like.

The middleware 430 may include a plurality of pre-implemented modules for providing functions that the application 470 commonly requires, and/or the like. Additionally, the middleware 430 may provide functions through the API 460 to allow the application 470 to efficiently use a limited system resource in an electronic device. For example, the middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, a security manager 452, a system providing manager 453, a device management manager 454 and/or the like.

The runtime library 435 may include a library module that a compiler uses to add a new function through programming language while the application 370 is executed. For example, the runtime library 435 may perform functions for input/output, memory management, an arithmetic function, and/or the like.

The application manager 441 may manage a life cycle of at least one application among the applications 470.

The window manager 442 may manage a graphical user interface (GUI) resource using a screen.

The multimedia manager 443 may determine a format necessary for the playback of various media files. Additionally, the multimedia manager 443 may perform encoding or decoding on a media file by using codec proper for a format necessary for the playback of media files.

The resource manager 444 may manage a resource for source code, memory, or storage space of at least one application among the applications 470.

The power manager 445 may manage a battery or power in operation with the basic input/output system (BIOS) and may provide power information necessary for an operation.

The database manager 446 may perform a management operation to generate, search, or change a database used for at least one application among the applications 370.

The package manager 447 may manage the installation or update of an application distributed in a package file format.

The connectivity manager 448 may manage a wireless connection of the electronic device 200.

The notification manager 449 may display or notify events such as arrival messages, appointments, and proximity alerts in a manner that is not disruptive to a user.

The location manager 550 may manage location information on the electronic device 200.

The graphic manager 551 may manage an effect to be provided to a user or a user interface relating thereto. The security manager 552 may provide a general security function necessary for system security or user authentication.

The device management manager 454 may add at least one application including a notification event characteristic among the applications 470 to a notification setting list. The device management manager 454 may execute a device management application 480 included in the application 470 and may add at least one application including a notification event characteristic. At this point, the device management manager 454 may recognize an application included in a notification setting list as a virtual device. For example, when a notification event occurs by at least one application among the applications 470, the device management manager 454 may add the at least one application generating the notification event to the notification setting list. Additionally, the device management manager 454 may add a notification event generated by an application program to the notification event list of a corresponding application program. As another example, the device management manager 454 may add at least one application including notification information among applications installed in the applications 470 to a notification setting list.

The system providing manager 453 may transmit notification event information to at least one peripheral device connected communication link. When the notification event occurrence information of the application included in the notification setting list is received from the notification manager 449, the system providing manager 453 may transmit notification event information to at least one peripheral device by executing the notification providing application 477 of the application 470. For example, in response to occurrence of a notification event by an application, the system providing manager 453 may transmit notification event information to at least one peripheral device and/or another electronic device. At this point, the system providing manager 453 may convert or reconfigure a notification event characteristic according to the output characteristic of a peripheral device to which notification event information is to be transmitted and then may transmit the notification event to a corresponding peripheral device. For example, when a notification event occurs, the system providing manager 453 may determine at least one peripheral device transmitting user input information to the electronic device 200 among at least one communication link connected peripheral device as a peripheral device to which notification event information is to be transmitted. At this point, the system providing manager 453 may determine at least one peripheral device transmitting user input information during a preceding reference time interval from the time at which a notification event occurs, as a peripheral device to which notification event information is to be transmitted.

If the electronic device 200 provides voice or video call service, the middleware 430 may further include a call manager for managing the voice or video call service of the electronic device 200.

The middleware 430 may generate and use a new middleware module through various function combinations of the above-mentioned internal component modules. The middleware 430 may provide modules specified according to types of an OS so as to provide distinctive functions. Additionally, the middleware 430 may dynamically delete some existing components or add new components. Accordingly, some components listed in various embodiments of the present disclosure may be omitted, other components are added, or components having different names but performing similar functions may be substituted.

The API 460, as a set of API programming functions, may be provided with a different configuration according an OS.

The application 470 may include at least one of preload application and third party application. For example, the application 470 may include a health application 471 (for example, an exercise measurement application and a blood sugar measurement application), an SMS/MMS application 472, an environmental application 473 (for example, a pressure or temperature information providing application), an alarm application 474, an e-mail application 475, a calendar application 476, a notification providing application 477, and a device management application 478.

The device management application 478 may include a function for adding at least one application including a notification event characteristic included in the application 470 to a notification setting list.

The notification providing application 477 may include a function for transmitting notification event occurrence information of an application included in a notification setting list to at least one peripheral device connected communication link. At this point, the notification providing application 477 may convert or reconfigure a notification event characteristic according to an output characteristic of a peripheral device to which notification event information is transmitted and then may transmit it to a corresponding peripheral device.

According to the above-mentioned embodiment, the electronic device 200 may set a virtual device by using the processor 220 and may then convert or reconfigure notification event information of a virtual device by using the notification providing module 222 according to an output characteristic of at least one peripheral device to transmit it.

According to another embodiment, the electronic device 200 may set a virtual device by using the processor 220 and may then convert or reconfigure notification event information of a virtual device according to an output characteristic of at least one peripheral device to transmit it. In this case, the processor 220 may be configured as shown in FIG. 5.

Figure 5:
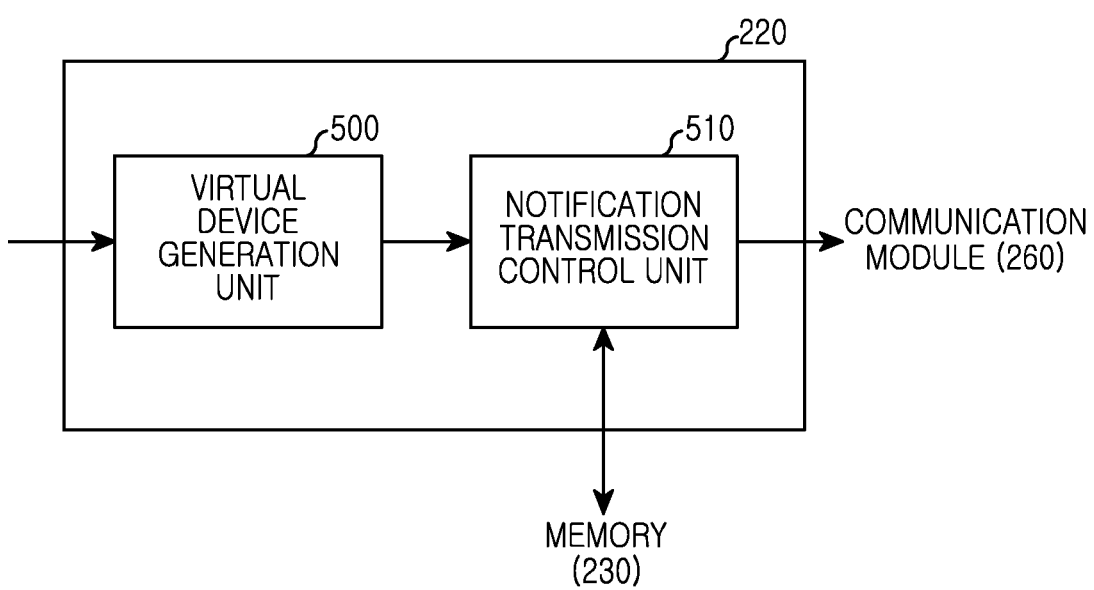
FIG. 5 is a block diagram illustrating a configuration of a processor according to an embodiment of the present disclosure.

FIG. 5 is a block diagram illustrating a configuration of a processor according to an embodiment of the present disclosure.

Referring to FIG. 5, the processor 220 may include a virtual device generation unit 500, a notification transmission control unit 510, and/or the like.

The virtual device generation unit 500 may add at least one application including a notification event characteristic among the applications installed in the electronic device 200 to a notification setting list. The virtual device generation unit 500 may add at least one application including a notification event characteristic to a notification setting list using the device management manager 454 included in the middleware 430. The virtual device generation unit 500 may recognize an application program included in a notification setting list as a virtual device. For example, when a notification event occurs by at least one application program among application programs installed in the electronic device 200, the virtual device generation unit 500 may add the at least one application program generating the notification event to the notification setting list. Additionally, the virtual device generation unit 500 may add a notification event generated by an application program to the notification event list of a corresponding application program. As another example, the virtual device generation unit 500 may add at least one application program including notification information among application programs installed in the electronic device 200 to a notification setting list.

When a notification event occurs by an application program included notification setting list, the notification transmission control unit 510 may transmit notification event information to at least one peripheral device connected communication link. For example, in response to the occurrence of a notification event, the notification transmission control unit 410 may transmit notification event information to at least one communication link-connected peripheral device and/or another electronic device. At this point, when the notification event occurrence information of the application included in the notification setting list is received from the notification manager 449 of the middleware 430, the notification transmission control unit 510 may transmit notification event information to at least one peripheral device by using the system providing manager 453 of the middleware 430. The notification transmission control unit 510 may convert or reconfigure a notification event characteristic according to the output characteristic of a peripheral device to which notification event information is to be transmitted and then may transmit the notification event characteristic to a corresponding peripheral device. For example, when a notification event occurs, the notification transmission control unit 510 may determine at least one peripheral device transmitting user input information to the electronic device 200 among at least one peripheral device as a peripheral device to which notification event information is to be transmitted. The notification transmission control unit 510 may determine at least one peripheral device transmitting user input information during a preceding reference time interval from the time at which a notification event occurs, as a peripheral device to which notification event information is to be transmitted.

Figure 6:
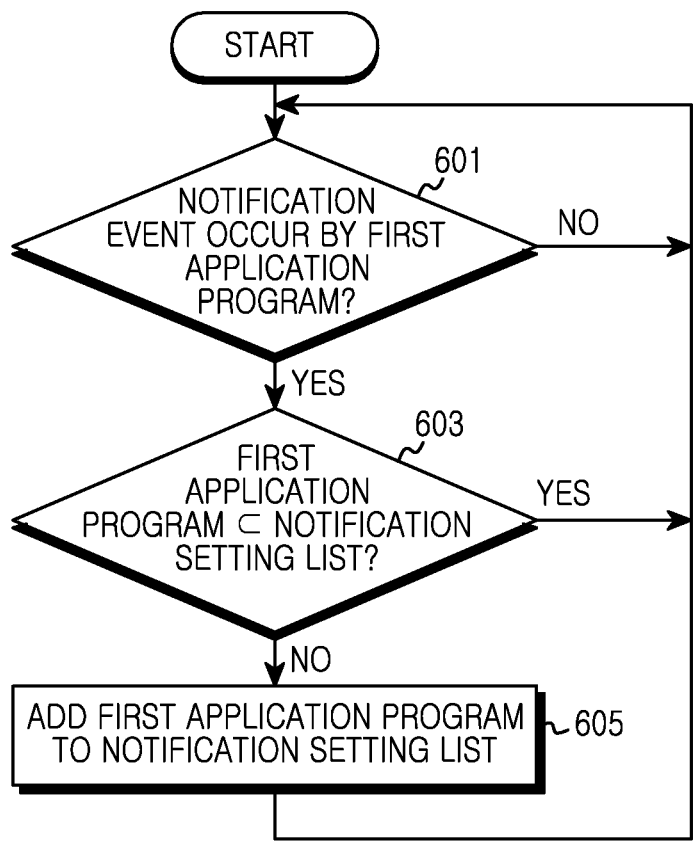
FIG. 6 is a flowchart illustrating a procedure for adding an application program generating a notification event to a notification setting list in an electronic device according to an embodiment of the present disclosure.

FIG. 6 is a flowchart illustrating a procedure for adding an application program generating a notification event to a notification setting list in an electronic device according to an embodiment of the present disclosure.

In the description below, the electronic device may add a first application program to a notification setting list by using the device management manager 454 of the middleware 430 shown in FIG. 4.

Referring to FIG. 6, at operation 601, the electronic device may determine whether a notification event occurs by the first application program among application programs installed in the electronic device. For example, the electronic device may determine whether a message is received through a messenger application program. As another example, the electronic device may determine whether an alarm occurs by an alarm application program. As another example, the electronic device may determine whether a call reception occurs by a communication application program. As another example, the electronic device may determine whether an alert notification such as low battery occurs through a power control application program. The message may include at least one of text messages, multimedia messages, emails, instant messages, and/or the like.

If the electronic device determines that a notification event does not occur by the first application program at operation 601, then the electronic device may return to operation 601 at which the electronic device may determine whether a notification event occurs by another application program among application programs installed in the electronic device. As another example, the electronic device may return to operation 601 at which the electronic device may continue to poll for occurrence of the notification event by the first application program.

If the electronic device determines that a notification event occurs by the first application program at operation 601, then the electronic device may proceed to operation 603 at which the electronic device may determine whether the first application program is included in the notification setting list. For example, the electronic device may determine whether the first application program is recognized as a virtual device. As an example, in response to the notification event occurring by the first application program, the electronic device may determine whether the first application program is included in the notification setting list.

If the electronic device determines that the first application program is included in the notification setting list at operation 603, then the electronic device may proceed to operation 601 and then may determine whether a notification event occurs by another application program among application programs installed in the electronic device.

In contrast, if the electronic device determines that the first application program is not included in the notification setting list at operation 603, then the electronic device may proceed to operation 605 at which the electronic device may add the first application program to the notification setting list. For example, the electronic device may recognize the first application program as a virtual device generating a notification event. For example, when the first application program includes notification information, the electronic device may display a notification setting screen for determining whether to add the first application program to the notification setting list on the display module 250. Thereafter, when a user accepts that the notification setting list addition of the first application program based on a notification setting screen, the electronic device may add the first application program to the notification setting list. Moreover, when a user does not accept that the notification setting list addition of the first application program based on a notification setting screen, the electronic device may proceed to operation 601 at which the electronic device may determine whether a notification event occurs by another application program among application programs installed in the electronic device.

As mentioned above, when the first application program is added to the notification setting list, the electronic device may recognize a notification event generated by the first application program as a notification event generated by a virtual device.

Figure 7:
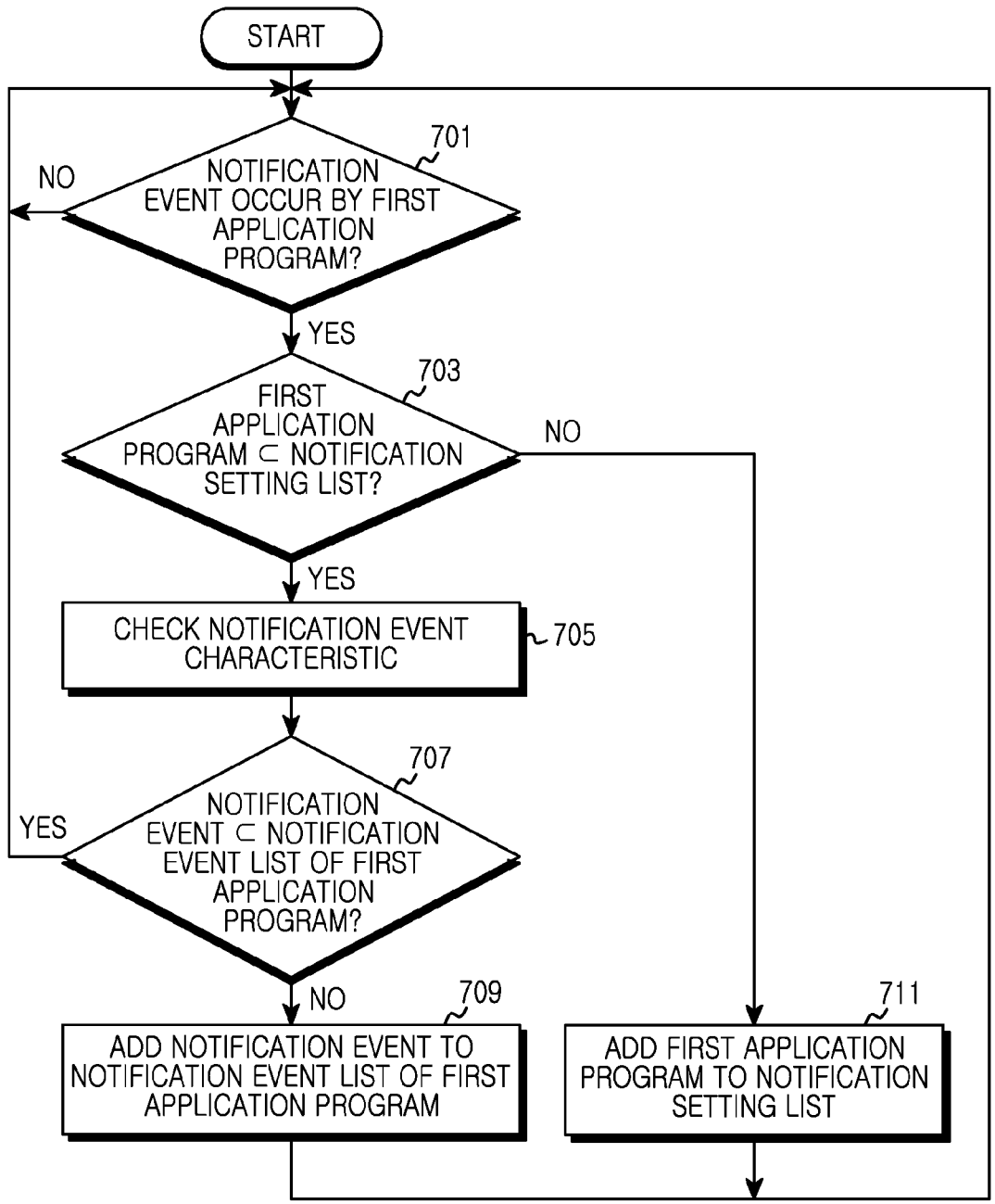
FIG. 7 is a flowchart illustrating a procedure for adding an application program generating a notification event to a notification setting list in an electronic device according to an embodiment of the present disclosure.

FIG. 7 is a flowchart illustrating a procedure for adding an application program generating a notification event to a notification setting list in an electronic device according to an embodiment of the present disclosure.

In the description below, the electronic device may add the first application program to the notification setting list by using the device management manager 454 of the middleware 430 shown in FIG. 4.

Referring to FIG. 7, at operation 701, the electronic device may determine whether a notification event occurs by the first application program among application programs installed in the electronic device. For example, the electronic device may determine whether a message is received through a messenger application program. As another example, the electronic device may determine whether an alarm occurs by an alarm application program. As another example, the electronic device may determine whether a call reception occurs by a communication application program. As another example, the electronic device may determine whether an alert notification such as low battery occurs through a power control application program. The message may include at least one of text messages, multimedia messages, emails, instant messages, and/or the like.

If the electronic device determines that a notification event does not occur by the first application program at operation 701, then the electronic device may return to operation 701 at which the electronic device may determine whether a notification event occurs by another application program among application programs installed in the electronic device. As another example, the electronic device may return to operation 701 at which the electronic device may continue to poll for occurrence of the notification event by the first application program.

If the electronic device determines that a notification event occurs by the first application program at operation 701, then the electronic device may proceed to operation 703 at which the electronic device may determine whether the first application program is included in the notification setting list. For example, in response to the occurrence of the notification event by the first application program, the electronic device may determine whether the first application program is included in the notification setting list. For example, the electronic device may determine whether the first application program is recognized as a virtual device.

If the electronic device determines that the first application program is not included in the notification setting list at operation 703, then the electronic device may proceed to operation 711 at which the electronic device may add the first application program to the notification setting list. For example, the electronic device may recognize the first application program as a virtual device generating a notification event. For example, the electronic device may display a notification setting screen for determining whether to add the first application program to the notification setting list on the display module 250. Thereafter, when a user accepts that the notification setting list addition of the first application program based on a notification setting screen, the electronic device may add the first application program to the notification setting list. Moreover, when a user does not accept that the notification setting list addition of the first application program based on a notification setting screen, the electronic device may proceed to operation 701 and then may determine whether a notification event occurs by another application program among application programs installed in the electronic device. The electronic device may add a notification event generated by the first application program added to the notification setting list to the notification event list.

If the electronic device determines that the first application program is included in the notification setting list at operation 703, then the electronic device may proceed to operation 705 at which the electronic device may determine a characteristic of a notification event generated by the first application program. For example, the electronic device may determine the type of a notification event generated by the first application program.

Thereafter, at operation 707, the electronic device may determine whether the notification event generated at operation 701 is included in the notification event list of the first application program.

If the electronic device determines that the notification event generated at operation 701 is included in the notification event list of the first application program at operation 707, then the electronic device may proceed to operation 701 and then may determine whether a notification event occurs by the first application program among application programs installed in the electronic device.

In contrast, if the electronic device determines that the notification event generated at operation 701 is not included in the notification event list of the first application program at operation 707, then the electronic device may proceed to operation 709 at which the electronic device may add the notification event generated in operation 701 to the notification event list of the first application program.

Figure 8:
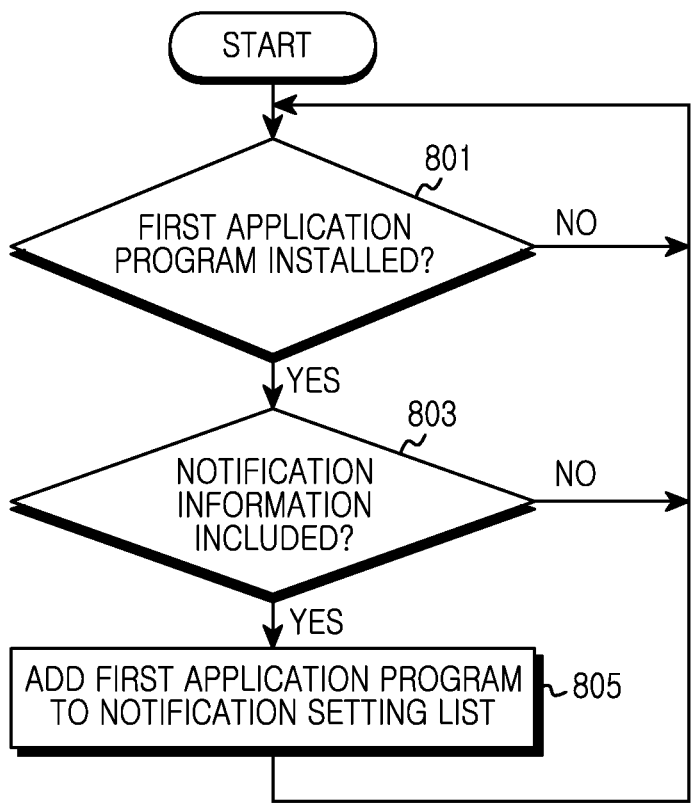
FIG. 8 is a flowchart illustrating a procedure for adding an application program to be installed to a notification setting list in an electronic device according to an embodiment of the present disclosure.

FIG. 8 is a flowchart illustrating a procedure for adding an application program to be installed to a notification setting list in an electronic device according to an embodiment of the present disclosure.

In the description below, the electronic device may add the first application program to the notification setting list by using the device management manager 454 of the middleware 430 shown in FIG. 4.

Referring to FIG. 8, at operation 801, the electronic device determines whether the first application program is installed.

If the electronic device determines that the first application program is not installed at operation 801, then the electronic device may return to operation 801 at which the electronic device may determine whether another application program is installed in the electronic device. As another example, the electronic device may return to operation 801 at which the electronic device may continue to poll for a determination that the first application program is installed.

If the electronic device determines that the first application program is installed at operation 801, then the electronic device may proceed to operation 803 at which the electronic device may determine whether the first application program includes notification information. For example, an application program developer may add notification information indicating that the notification event occurrence of the application program is possible to the application program. Accordingly, the electronic device may determine whether the first application program includes notification information. The notification information may include at least one of information on whether the notification event occurrence of the first application program is possible and a possible notification event type in the first application program.

If the electronic device determines that the first application program does not include notification information at operation 803, then the electronic device may proceed to operation 801 at which the electronic device may determine whether another application program is installed.

If the electronic device determines that the first application program includes the notification information at operation 803, the electronic device may add the first application program to the notification setting list in operation 805. For example, the electronic device may recognize the first application program as a virtual device generating a notification event. For example, when the first application program includes notification information, the electronic device may display a notification setting screen for determining whether to add the first application program to the notification setting list on the display module 250. Thereafter, when a user accepts that the notification setting list addition of the first application program based on a notification setting screen, the electronic device may add the first application program to the notification setting list. Moreover, when a user does not accept that the notification setting list addition of the first application program based on a notification setting screen, the electronic device may proceed to operation 801 at which the electronic device may determine whether another application program is installed.

In the above-mentioned various embodiments of the present disclosure, the electronic device may add an application program generated by a notification event to the notification setting list and then may recognize the application program as a virtual device.

Figure 9A:
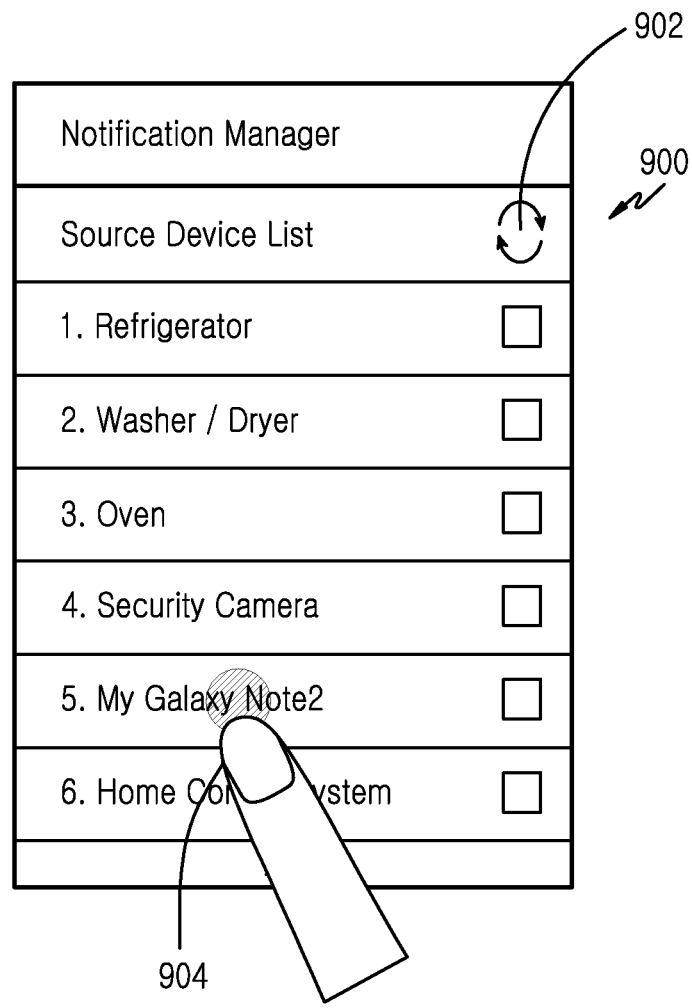
FIGS. 9A and 9B are views illustrating a notification setting list screen according to an embodiment of the present disclosure.
Figure 9B:
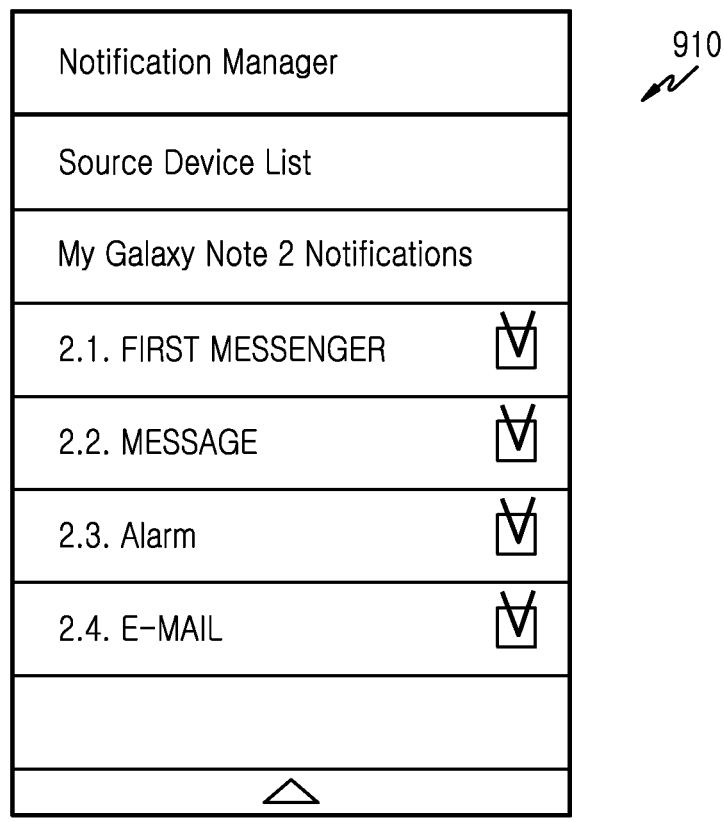

Additionally, the electronic device may selectively deactivate the application program added to the notification setting list as shown in FIGS. 9A and 9B.

FIGS. 9A and 9B are views illustrating a notification setting list screen according to an embodiment of the present disclosure.

Referring to FIG. 9A, in response to occurrence of a source list management event, the electronic device may display a source list 900 of notification service on the display module 150. Thereafter, the electronic device may search the source list 900 according to the selection of a refresh icon 902 and then may update the source list 900.

As an example, in response to selection of an electronic device "My Galaxy Note2" from the source list 900 as shown with reference to reference numeral 904, the electronic device may display an application program included in a notification setting list on the display module 150. For example, the electronic device may display application program list recognized as a virtual device on the display module 150. The electronic device may deactivate at least one application program among application programs included in a notification setting list according to user input information. For example, when the selection of a message application program is released according to user input information, the electronic device may deactivate the message application program in the notification setting list. In this case, the electronic device may transmit notification event information generated by the message application program to a peripheral device.

Referring to FIG. 9B, the electronic device may display a list of types of notifications that may be selected for a corresponding device. For example, as illustrated with reference to reference numeral 910, the electronic device may display a notifications manager screen for a washer/dryer. For example, in response to selection of a washer/dryer from the source list 900, the electronic device may display a notification setting list for the washer/dryer. The notification setting list may include a list of notification types and/or application programs that may be used to communicate with the selected device (e.g., the washer/dryer). As illustrated in FIG. 9B, the notification setting list may include a first messenger, a message, an alarm, and an email. The notification setting list may indicate the communication methods or means by which the electronic device provides notifications in relation to the selected device (e.g., the washer/dryer according to the example illustrated in FIG. 9B) according to user selection. The notification setting list may provide a list of application programs from which a user may select a subset of application programs that may be used to provide notifications in relation to the selected device.

Figure 10:
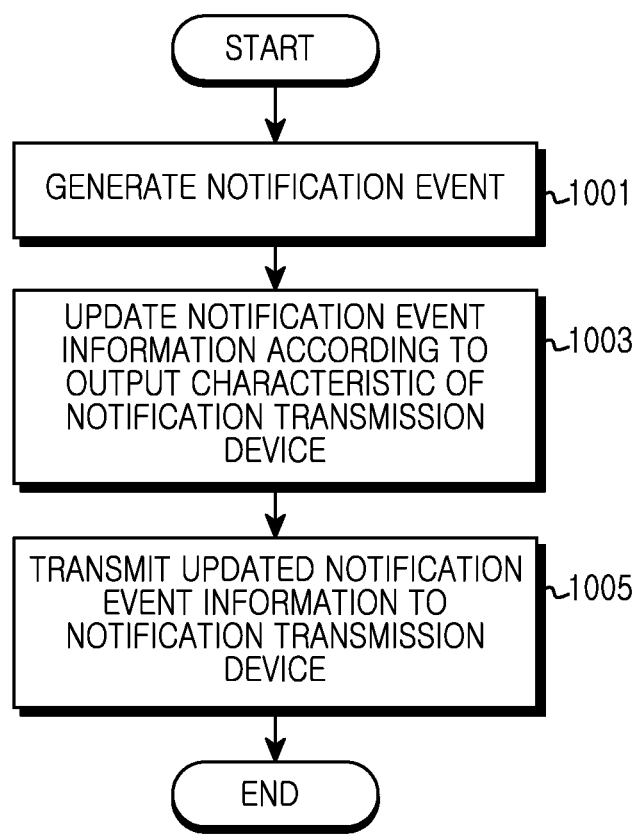
FIG. 10 is a flowchart illustrating a procedure for transmitting notification event information in an electronic device according to an embodiment of the present disclosure.

FIG. 10 is a flowchart illustrating a procedure for transmitting notification event information in an electronic device according to an embodiment of the present disclosure.

Referring to FIG. 10, at operation 1001, the electronic device may determine a notification event occurrence by an application program included in the notification setting list. For example, the electronic device may determine a notification event generated by an application program recognized as a virtual device.

Thereafter, at operation 1003, the electronic device may update notification event information according to the output characteristic of a notification transmission device. For example, when a smart watch is recognized as a notification transmission device for transmitting notification event information according to a message reception, the electronic device may update the notification event information according to a message reception based on output information from the smart watch. In more detail, the electronic device may update notification event information according to a message reception so as to output a message reception from the smart watch as at least one of auditory information, visual information, smell information and/or tactile information according to output information of the smart watch. The notification transmission device may include at least one peripheral device transmitting notification event information among peripheral devices connected to the electronic device.

After updating the notification event information at operation 1003, the electronic device may proceed to operation 1005 at which the electronic device may transmit the notification event information updated to the notification transmission device.

According to the above-mentioned embodiment, the electronic device may update notification event information according to an output characteristic of a notification transmission device. For example, while performing a communication link connection with a notification transmission device (for example, pairing), the electronic device may check an output characteristic of the notification transmission device based on control information provided from the notification transmission device. Here, the control information may include a profile of the notification transmission device. As another example, the electronic device may receive output characteristic information of a corresponding notification transmission device by using an additional control message from the notification transmission device. As another example, the electronic device may receive output characteristic information of a notification transmission device connected to the electronic device from an output characteristic management server.

Figure 11:
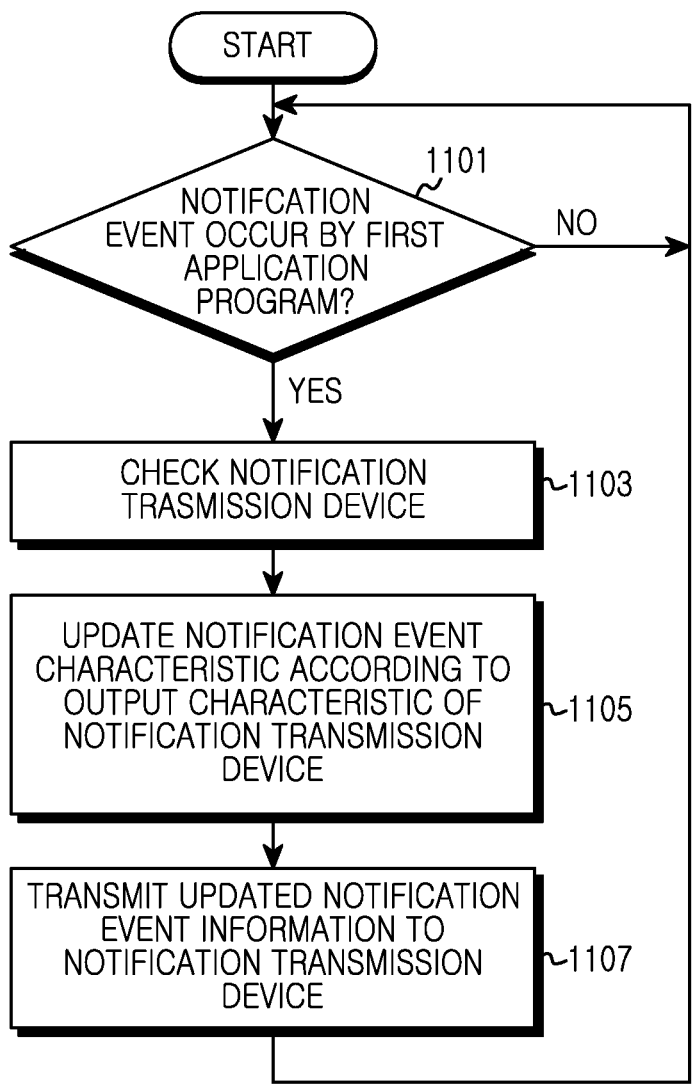
FIG. 11 is a flowchart illustrating a procedure for transmitting notification event information in an electronic device according to an embodiment of the present disclosure.

FIG. 11 is a flowchart illustrating a procedure for transmitting notification event information in an electronic device according to an embodiment of the present disclosure.

Referring to FIG. 11, at operation 1101, the electronic device may determine whether a notification event occurs by a first application program included in the notification setting list. If a notification event occurs by the first application program not included in the notification setting list, the electronic device, as shown in FIG. 6 or 7, may add the first application program to the notification setting list and may recognize that a notification event occurs by the application program included in the notification setting list.

If the electronic device determines that a notification event does not occur by the first application program at operation 1101, then the electronic device may return to operation 1101 at which the electronic device may determine whether a notification event occurs by another application program among application programs installed in the electronic device. As another example, the electronic device may return to operation 1101 at which the electronic device may continue to poll for occurrence of the notification event by the first application program.

If the electronic device determines that a notification event occurs by the first application program at operation 1101, then the electronic device may proceed to operation 1103 at which the electronic device may determine a notification transmission device. For example, in response to a notification event, the electronic device may determine a notification transmission device (e.g. with which to transmit information relating to the notification event). For example, the electronic device may determine at least one peripheral device connected communication link as a notification transmission device. As another example, the electronic device may determine at least one peripheral device transmitting user input information to the electronic device among at least one peripheral device, as a notification transmission device. The electronic device may determine at least one peripheral device transmitting user input information during a preceding reference time interval from the time at which a notification event occurs, as a notification transmission device.

After determining the notification transmission device at operation 1103, the electronic device may proceed to operation 1105 at which the electronic device may update notification event information according to the output characteristic of the notification transmission device. For example, when a smart bulb is recognized as a notification transmission device for transmitting notification event information according to a call reception, the electronic device may update the notification event information according to the call reception based on output information from the smart bulb. In more detail, the electronic device may update notification event information according to a call reception so as to output the call reception from the smart bulb as visual information according to output information of the smart bulb.

After updating the notification event information at operation 1105, the electronic device may proceed to operation 1107 at which the electronic device may transmit the notification event information updated to the notification transmission device.

Figure 12:
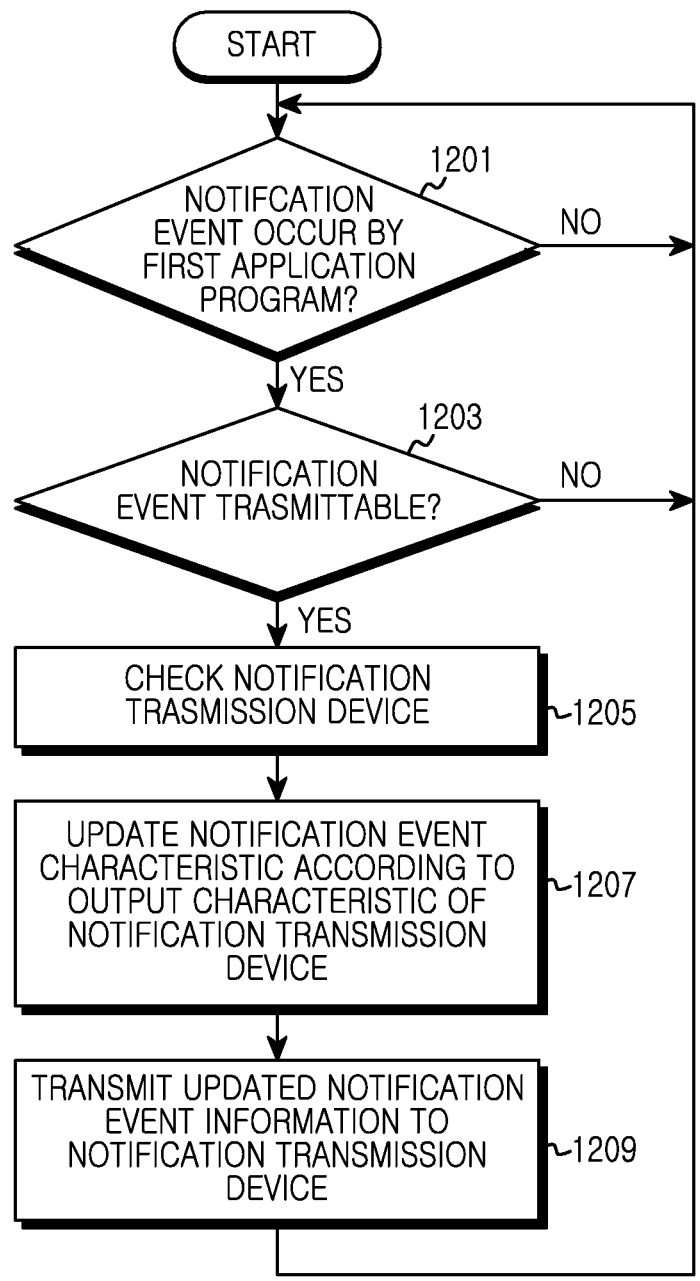
FIG. 12 is a flowchart illustrating a procedure for transmitting notification event information in an electronic device according to an embodiment of the present disclosure.

FIG. 12 is a flowchart illustrating a procedure for transmitting notification event information in an electronic device according to another embodiment of the present disclosure.

Referring to FIG. 12, at operation 1201, the electronic device may determine whether a notification event occurs by a first application program included in the notification setting list. If a notification event occurs by the first application program not included in the notification setting list, the electronic device, as shown in FIG. 6 or 7, may add the first application program to the notification setting list and then may recognize that a notification event occurs by the application program included in the notification setting list.

If the electronic device determines that a notification event does not occur by the first application program at operation 1201, then the electronic device may return to operation 1201 at which the electronic device may determine whether a notification event occurs by another application program among application programs installed in the electronic device. As another example, the electronic device may return to operation 1201 at which the electronic device may continue to poll for occurrence of the notification event by the first application program.

If the electronic device determines that a notification event occurs by the first application program at operation 1201, then the electronic device may proceed to operation 1203 at which the electronic device may determine whether the notification event is transmittable. For example, in response to a notification event, the electronic device may determine whether the notification event and/or information relating thereto may be transmitted. For example, the electronic device may limit notification event information transmission for at least one notification event among notification events that may occur in the first application program. Accordingly, the electronic device may determine whether the notification event information transmission of the notification event occurring at operation 1201 is limited. In more detail, the electronic device may limit the notification event information transmission for a message provided from at least one the other electronic device in a message application program. Accordingly, in the case that a message is received through a messenger application program, the electronic device may determine whether the message is received from the other electronic device limiting the notification event information transmission.

If the electronic device determines that a notification event cannot be transmitted at operation 1203, then the electronic device may proceed to operation 1201 at which the electronic device may determine whether the notification event occurs by an application program included in the notification setting list.

In contrast, if the electronic device determines that the notification event can be transmitted at 1203, then the electronic device may proceed to operation 1205 at which the electronic device may determine the notification transmission device. For example, the electronic device may determine at least one peripheral device connected communication link as a notification transmission device. As another example, the electronic device may determine at least one peripheral device transmitting user input information to the electronic device among at least one peripheral device, as a notification transmission device. The electronic device may determine at least one peripheral device transmitting user input information during a preceding reference time interval from the time at which a notification event occurs, as a notification transmission device.

After determining the notification transmission device at operation 1205, the electronic device may proceed to operation 1207 at which the electronic device may update notification event information according to the output characteristic of the notification transmission device. For example, when a smart TV is recognized as a notification transmission device for transmitting notification event information according to a message reception, the electronic device may update the notification event information according to a message reception based on output information from the smart TV. In more detail, the electronic device may update notification event information according to a message reception so as to output a message reception from the smart TV as at least one of auditory information and visual information according to output information of the smart TV.

After updating the notification event information at operation 1207, the electronic device may proceed to operation 1209 at which the electronic device may transmit the updated notification event information to the notification transmission device.

As mentioned above, the electronic device may update notification event information based on the output characteristic of a notification transmission device. At this point, the electronic device may selectively limit the output characteristic of a notification transmission device according to user input information as shown in FIGS. 13A to 13D.

FIGS. 13A to 13D are views illustrating a management screen for the transmission of notification event information according to an embodiment of the present disclosure.

Figure 13A:
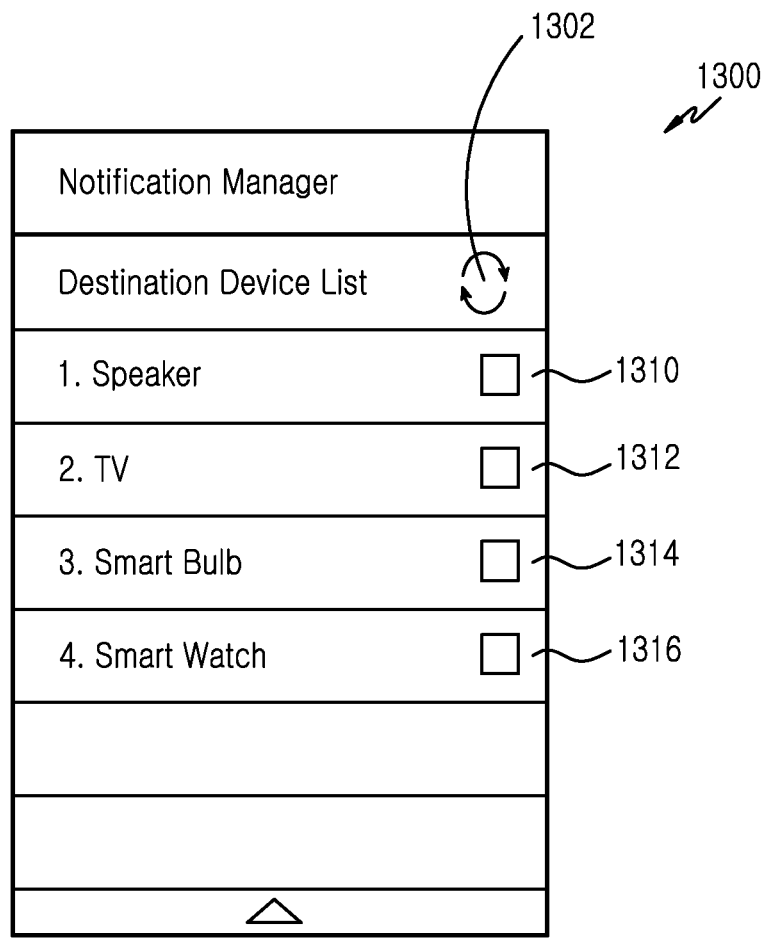
FIGS. 13A, 13B, 13C, and 13D are views illustrating a management screen for a transmission of notification event information according to an embodiment of the present disclosure.

Referring to FIG. 13A, when a notification transmission device management event occurs, the electronic device may display a notification transmission device list 1300 including a speaker 1310, a TV 1312, a smart bulb 1314, and a smart watch 1316, on the display module 150. At this point, the electronic device may search the device list 1300 according to the selection of a refresh icon 1302 and then may update the device list 1300.

Figure 13B:
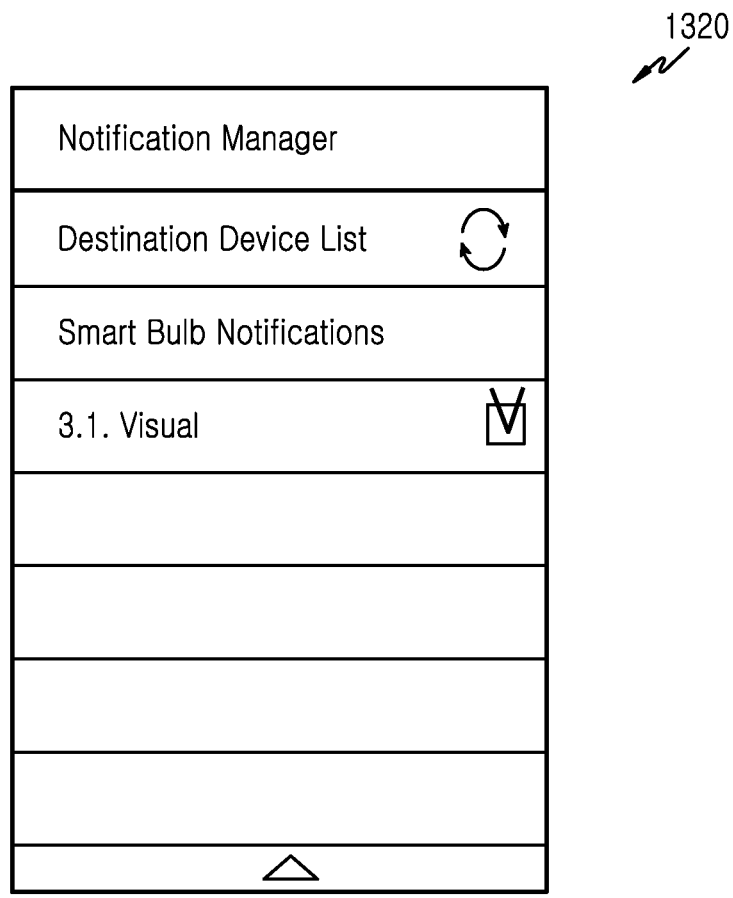

Referring to FIG. 13B, when the smart bulb 1314 is selected from the device list 1300, the electronic device may display visual information as the output characteristic 1320 of the smart bulb 1314, on the display module 150. As an example, in response to selection of the smart bulb 1314 from the device list 1300, the electronic device may display visual information as the output characteristic 1320 of the smart bulb 1314.

Figure 13C:
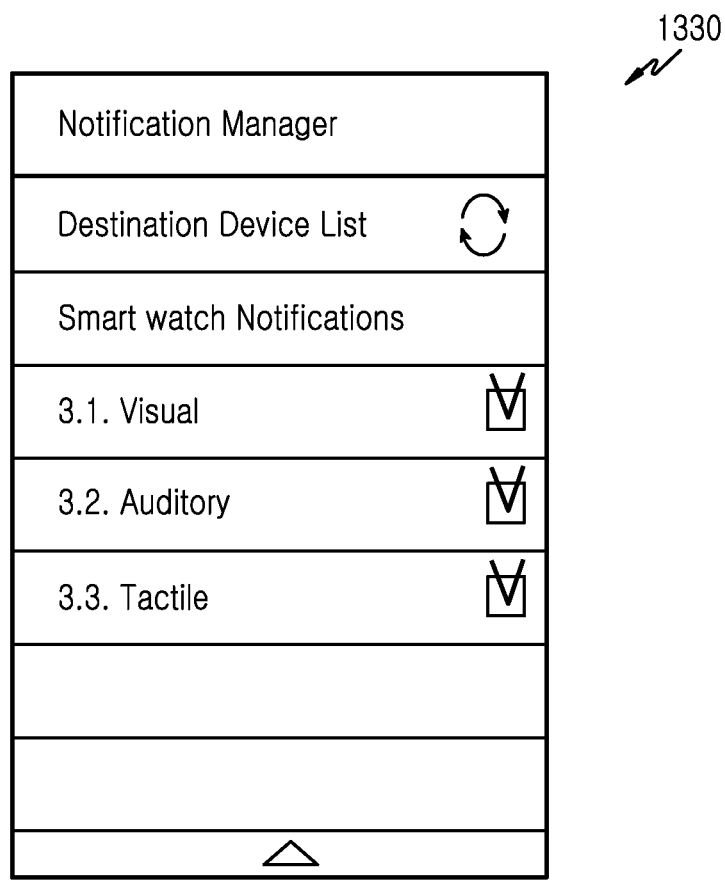

Referring to FIG. 13C, when the smart watch 1316 is selected from the device list 1300, the electronic device may display auditory information, visual information, and tactile information as the output characteristic 1330 of the smart watch 1316, on the display module 150. As an example, in response to selection of the smart watch 1316 from the device list 1300, the electronic device may display the output characteristic 1330 of the smart watch 1316. The electronic device may limit the output characteristic of the smart watch 1316, which is considered during notification event information update according to user input information. The user may select the output characteristics to be applied in relation to the corresponding device (e.g., the smart watch 1316).

Figure 13D:
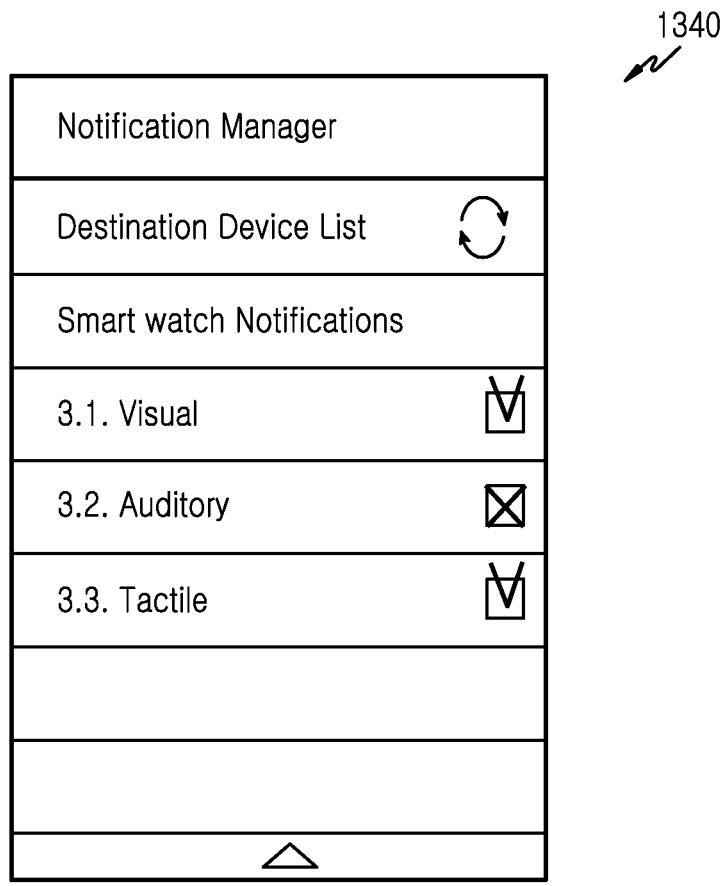

Referring to FIG. 13D the electronic device may deactivate the auditory information among the output characteristics of the smart watch 1316 according to user input information as shown in 1340. In this case, the electronic device may recognize that the smart watch 1316 includes the output characteristics of the visual information and the tactile information. In response to user selection of characteristics to be applied in relation to the corresponding device, the electronic device may display the output characteristics that are activated and/or deactivated. For example, as illustrated in FIG. 13D, the output characteristics of the visual information and the tactile information are illustrated as active, and the output characteristics of the auditory information is illustrated as deactivated.

As mentioned above, the electronic device may transmit updated notification event information to a corresponding notification transmission device based on the output characteristic of a notification transmission device. Accordingly, the notification transmission device may output notification event occurrence information according to the notification event information provided from the electronic device so as to allow a user to determine occurrence of a notification event and/or a type of notification event that occurred. For example, when the electronic device updates notification event information for message reception based on the output characteristic of a TV and transmits the notification event information, the TV may output at least one of a message reception arrival notification screen and a message reception notification sound according to the notification event information provided from the electronic device. As another example, when the electronic device updates notification event information for call reception based on the output characteristic of a smart watch and transmits the notification event information, the smart watch may output at least one of a call reception arrival notification screen and message reception notification sound and vibration according to the notification event information provided from the electronic device.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, random access memory (RAM), memory chips, device or integrated circuits or on an optically or magnetically readable medium such as, for example, a compact disk (CD), DVD, magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure.

Accordingly, various embodiments provide a program comprising code for implementing apparatus or a method as claimed in any one of the claims of this specification and a non-transitory machine-readable storage storing such a program. Still further, such programs may be conveyed electronically via any medium such as a communication signal carried over a wired or wireless connection and various embodiments suitably encompass the same.

As mentioned above, the electronic device updates notification event information generated by an application program according to the output characteristic of a peripheral device and transmits it to a corresponding peripheral device, so that a user of the electronic device may easily recognize notification information occurring in the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   determining whether a notification event is detected by an application installed in the electronic device;
   determining, by the electronic device, at least one peripheral device for outputting information corresponding to the notification event among a plurality of peripheral devices in response to the notification event;
   identifying, by the electronic device, an output characteristic supported by the at least one peripheral device;
   converting, by the electronic device, the information to output information corresponding to the identified output characteristic; and
   transmitting, by the electronic device, the converted output information of the notification event to the at least one peripheral device.

2. The method of claim 1, further comprising,
   when an event occurs by at least one application program among a plurality of application programs installed in the electronic device before the identifying of the output characteristic, adding the at least one application program generating the event to a notification setting list.

3. The method of claim 1, further comprising,
   when an application program including notification information is installed in the electronic device, adding the application program to a notification setting list.

4. The method of claim 1, wherein the identifying of the output characteristic comprises:
   receiving control information from the at least one peripheral device, while performing a communication link connection with the at least one peripheral device; and
   identifying an output characteristic of at least one peripheral device based on the received control information.

5. The method of claim 1, wherein the identifying of the output characteristic comprises, when an event occurs by at least one application program included in a notification setting list, identifying an output characteristic of at least one peripheral device that is communication-link-connected to the electronic device.

6. The method of claim 1, wherein the identifying of the output characteristic comprises, when an event occurs by at least one application program included in a notification setting list, identifying an output characteristic of at least one peripheral device transmitting user input information to the electronic device among a plurality of peripheral devices that is communication-link-connected to the electronic device.

7. The method of claim 1, wherein the output characteristic comprises at least one of auditory information, visual information, and tactile information to output by a peripheral device.

8. The method of claim 1, wherein the converting of the output information based on the output characteristic of the at least one peripheral device comprises converting output information of an event generated by at least one application program included in a notification setting list among application programs installed in the electronic device.

9. The method of claim 1, wherein the transmitting of the converted output information of the event comprises transmitting the converted output information of the event to the at least one peripheral device through a wire link or a wireless link that are connected to the at least one peripheral device.

10. The method of claim 1, wherein the identifying of the output characteristic of at least one peripheral device comprises:
receiving user selection of at least one of activating a capability of the at least one peripheral device to correspond to an output characteristic thereof, and
deactivating a capability of the at least one peripheral device such that the capability does not correspond to an output characteristics thereof.

11. A non-transitory computer-readable storage medium storing instructions that, when executed, cause at least one processor to perform the method of claim 1.

12. An electronic device comprising:
a memory configured to store at least one application program; and
at least one processor configured to:
determine whether a notification event is detected by an application installed in the electronic device,
determine at least one peripheral device for outputting information corresponding to the notification event among a plurality of peripheral devices in response to the notification event,
identify an output characteristic supported by the at least one peripheral device,
convert the information to output information corresponding to the identified output characteristic of the at least one peripheral device, and
transmit the converted output information of the notification event to the at least one peripheral device.

13. The device of claim 12, wherein the processor is further configured to:
add at least one application program among application programs stored in the memory to a notification setting list.

14. The device of claim 13, wherein the processor is further configured to:
in response to an occurrence of an event by at least one application program among application program stored in the memory, the processor is configured to add the at least one application program generating the event to the notification setting list.

15. The device of claim 13, wherein the processor is further configured to:
in response to an installation of an application program including notification information in the electronic device, add the application program to the notification setting list.

16. The device of claim 13, wherein the processor is further configured to:
receive user selection of at least one of activating a capability of the at least one peripheral device to correspond to an output characteristic thereof, and
deactivate a capability of the at least one peripheral device such that the capability does not correspond to an output characteristics thereof.

17. The device of claim 12, wherein the processor is further configured to:
receive control information from the at least one peripheral device, while performing a communication link connection with the at least one peripheral device, and
identify an output characteristic of at least one peripheral device based on the received control information.

18. The device of claim 12, wherein the processor is further configured to:
in response to an occurrence of an event by at least one application program included in a notification setting list, identify an output characteristic of at least one peripheral device that is communication-link-connected to the electronic device.

19. The device of claim 12, wherein the processor is further configured to:
in response to an occurrence of an event by at least one application program included in a notification setting list, identify an output characteristic of at least one peripheral device transmitting user input information to the electronic device among a plurality of peripheral devices that is communication-link-connected to the electronic device.

20. The device of claim 12, wherein the output characteristic comprises at least one of auditory information, visual information, and tactile information to output by a peripheral device.

21. The device of claim 12, wherein the processor is further configured to:
convert output information of an event generated by at least one application program included in a notification setting list among application programs stored in the memory based on the output characteristic of the at least one peripheral device.

22. The device of claim 12, further comprising:
a communication unit configured to transmit/receive a signal to/from the at least one peripheral device through a wire link or a wireless link,
wherein the communication unit is configured to transmit the converted output information of the event to the at least one peripheral device through a wire link or a wireless link that are connected to the at least one peripheral device.

* * * * *